(Model.)

G. TAINTER.
Glue Pot.

No. 243,005. Patented June 14, 1881.

Witnesses
H. E. Renick
George Lawson

Inventor
George Tainter
by his attorney,
A. K. Spencer

UNITED STATES PATENT OFFICE.

GEORGE TAINTER, OF WATERTOWN, MASSACHUSETTS.

GLUE-POT.

SPECIFICATION forming part of Letters Patent No. 243,005, dated June 14, 1881.

Application filed March 1, 1880. (Model.)

*To all whom it may concern:*

Be it known that I, GEORGE TAINTER, of Watertown, Massachusetts, have invented certain Improvements in Portable Glue-Pots; and I hereby declare that the same are fully described in the following specification and illustrated in the accompanying drawings.

The object of this invention is to prevent the formation of a thickened film upon the surface of the liquid glue, to prevent the glue from collecting on the sides of the kettle, to prevent the evaporation of moisture from the surface of the glue, and to provide for inserting the brush in the glue without removing the cover.

My invention consists in a portable glue-pot provided with a removable cover, and with a centrally-located brush-tube extending down nearly to the bottom of the pot, and there communicating with the glue contained therein. My apparatus is equally adapted for shellac-kettles.

Figure 1:
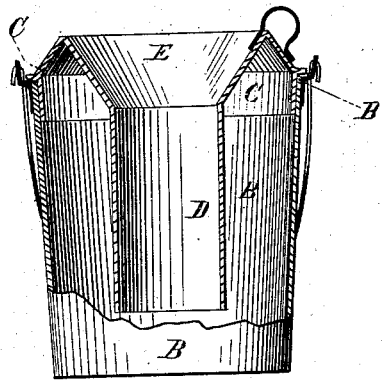
Figure 2:
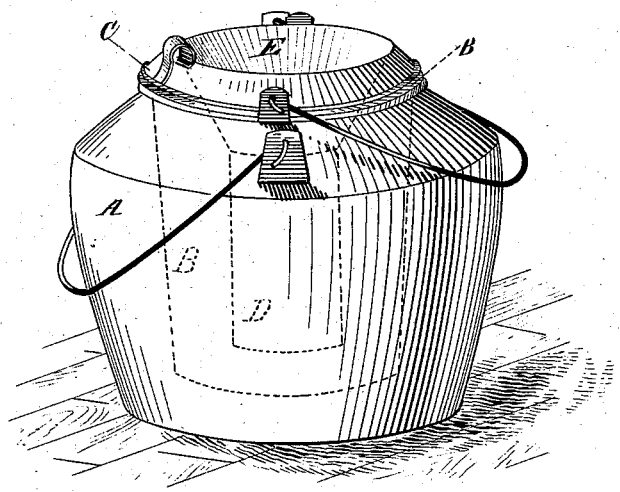

The nature and mode of operation of my improvement will be readily understood by reference to the drawings, which represent in Figures 1 and 2 the best form in which I have contemplated applying my invention, Fig. 1 being a vertical central section of a glue-pot provided with my improvement; Fig. 2, a perspective view of the same.

A is the outer vessel, containing water to be heated; and B, the glue-pot proper, to receive the glue which is liquefied therein, and is kept at a suitable temperature by the heat of the surrounding water.

C is the cover of the glue-pot, preferably made conical or tapering toward the outer rim, so that the water of condensation thereon will readily run down and be returned to the glue in the pot B, which is thus kept at a uniform consistency, with its strength unimpaired, and scum is prevented from forming on top.

D is the brush-tube, placed vertically at the center of the pot, secured to and projecting down from the open center of the cover nearly to the bottom of the pot, where it is open into the liquid glue. The tube D is of suitable size only to receive the brush, and, as all other portions of the pot B are inclosed by the cover, the glue is protected from exposure to the air, and surface scum, due to rapid evaporation or to sudden cooling, forming a film thereon, is avoided.

E is a mouth with which the cover may be furnished, in order that the brush may enter more readily into the tube D, and that any surplus glue may be returned to the pot.

If preferred, instead of uniting the central brush-tube to the cover, it may be secured to the bottom of the pot B, leaving an opening for the free entrance of the glue, and extending up to meet the opening in the cover C. In either case the tube is open or perforated at the bottom, that the liquid may freely enter it, and is so arranged at the top that the cover C need not be removed to insert the brush. I however regard the plan first described, and shown in the drawings, as the best for several reasons.

The cover is in all cases made removable for the purpose of supplying the crude dry glue to the interior of the pot B preparatory to its liquefaction for use.

I sometimes corrugate or flute the cover C from top to bottom for ornamentation and to increase its strength.

I find it advantageous to make the pots B of a suitable size to fit the water-kettles A now in ordinary use, so as to make the latter available with my improvements.

When applied to shellac-pots my invention prevents the rapid vaporization of the alcohol.

I am aware that a set steam-kettle having a brush-tube in its cover has heretofore been made for boiling and stirring a cement made of gutta-percha and benzine, in which case the shaft of the rotary stirring apparatus passed centrally through the cover, which was necessarily fastened to the kettle to prevent escape of the injurious and inflammable benzine fumes, a door through the cover being provided for introducing the materials. I disclaim such apparatus and limit myself to the ordinary portable glue-pots and shellac-pots when provided with a central brush-tube, as described, and a cover for which no fastenings are required and through which no stirrer passes.

I claim as of my invention—

1. A portable glue-pot provided with a removable cover having a brush-tube, as described, descending from its center, in combination with an outer water-heating vessel, for the purpose set forth.

2. A portable glue-pot provided with a removable conical cover having a central brush-tube with a flaring mouth, as described, in combination with an outer water-heating vessel, for the purpose set forth.

GEORGE TAINTER.

Witnesses:
A. H. SPENCER,
E. A. PHELPS.